United States Patent [19]

Funahashi et al.

[11] Patent Number: 5,145,155
[45] Date of Patent: Sep. 8, 1992

[54] METHOD OF MANUFACTURING FLUID-FILLED ELASTIC MOUNT HAVING FLUID INJECTION HOLE FOR FILLING PRESSURE-RECEIVING AND EQUILIBRIUM CHAMBERS

[75] Inventors: Yoshiki Funahashi, Iwakura; Masayuki Hibi, Komaki, both of Japan

[73] Assignee: Tokai Rubber Industries, Ltd., Japan

[21] Appl. No.: 608,393

[22] Filed: Nov. 2, 1990

[30] Foreign Application Priority Data

Nov. 2, 1989 [JP] Japan .................. 1-286544

[51] Int. Cl.⁵ .................. F16M 1/00; F16M 7/00; B60G 13/00; F16F 9/00
[52] U.S. Cl. .................. 267/140.12; 267/292; 267/219; 267/141; 267/136
[58] Field of Search .................. 267/292, 140.1, 136, 267/141, 141.1, 219, 258, 140.2, 140.3, 140.4

[56] References Cited

U.S. PATENT DOCUMENTS

| | | | |
|---|---|---|---|
| 4,690,389 | 9/1987 | West | 267/140.1 |
| 4,779,853 | 10/1988 | Sugino et al. | 267/219 |
| 4,854,561 | 8/1989 | Kanda | 267/292 |

*Primary Examiner*—Joseph F. Peters, Jr.
*Assistant Examiner*—Kenneth Lee
*Attorney, Agent, or Firm*—Parkhurst, Wendel & Rossi

[57] ABSTRACT

A method of manufacturing a fluid-filled elastic mount which includes an electric body flexibly connecting an inner and an outer sleeve, means for defining a pressure-receiving chamber and an equilibrium chamber which are filled with a non-compressible fluid, and means for defining an orifice passage for fluid connection between the two chambers, the equilibrium chamber being defined partially by a rigid member and partially by a flexible diaphragm which permits volumetric changes of he equilibrium chamber. The present method includes the steps of: (a) preparing a mount body having the pressure-receiving and equilibrium chambers and orifice passage; (b) forming at least one injection hole through the rigid member partially defining the equilibrium chamber, such that the injection hole or hole is-/are open on an outer surface of the elastic mount other than an outer circumferential surface of the outer sleeve; (c) injecting the non-compressible fluid through the injection hole(s), into the equilibrium and pressure-receiving chambers and the orifice passage; and (d) fluid-tightly closing the injection hole(s) upon completion of filling of the equilibrium and pressure-receiving chambers and orifice passage.

14 Claims, 7 Drawing Sheets

METHOD OF MANUFACTURING FLUID-FILLED ELASTIC MOUNT HAVING FLUID INJECTION HOLE FOR FILLING PRESSURE-RECEIVING AND EQUILIBRIUM CHAMBERS

BACKGROUND OF THE INVENTION

1. Field of the Invention

The present invention relates in general to a method of manufacturing a fluid-filled elastic mount adapted to damp vibrations applied thereto, based on flows of a non-compressible fluid contained in the mount. More particularly, this invention is concerned with an improved method of manufacturing such a fluid-filled elastic mount, by which the filling of the mount with the fluid can be easily accomplished while assuring sufficiently high fluid tightness of the mount.

2. Discussion of the Prior Art

A cylindrical elastic mount is known as a vibration damping member interposed between two members of a vibration system for flexibly connecting these two members. The elastic mount includes an inner sleeve, an outer sleeve disposed radially outwardly of the inner sleeve, and an elastic body interposed between the inner and outer sleeves for flexibly connecting the two sleeves. This elastic mount is adapted to damp vibrations which are applied between the inner and outer sleeves primarily in a diametric direction of the mount. The elastic mount of the above type can be made small-sized or compact, and undergoes an effectively limited amount of relative displacement between the inner and outer sleeves when the mount receives an excessive amount of vibrational load. For this advantage, such an elastic mount is suitably used as an engine mount, a differential gear mount, a vehicle body mount and a suspension bushing for motor vehicles, for example.

In recent years, to meet an increasing requirement for higher vibration damping capability on motor vehicles with high performance, there is proposed a so-called fluid-filled elastic mount which is adapted to damp applied vibrations based on flows of a fluid contained therein. Examples of such an elastic mount are disclosed in laid-open Publications Nos. 63-172035 and 62-196434 of unexamined Japanese Patent Applications and U.S. Pat. No. 4,690,389. The elastic mount disclosed therein has a pressure-receiving chamber and a variable-volume equilibrium chamber which are formed between the inner and outer sleeves connected by the elastic body, and which are filled with a non-compressible fluid. Upon application of a vibrational load to the elastic mount, the pressure in the pressure-receiving chamber is changed due to elastic deformation of the elastic body. The equilibrium chamber is at least partially defined by a flexible diaphragm so that a change in the pressure of the chamber is absorbed or prevented by elastic deformation of the diaphragm. The elastic mount further has an orifice passage through which the fluid flows between the pressure-receiving and equilibrium chambers.

In manufacturing the fluid-filled elastic mount constructed as described above, it is necessary to fill the pressure-receiving and equilibrium chambers with the non-compressible fluid. Conventionally, diametrically opposite two pockets are formed in the elastic body, and the openings of these pockets are closed by the outer sleeve fitted on the elastic body, so as to provide the pressure-receiving and equilibrium chambers. The filling of the chambers with the fluid is effected by mounting the outer sleeve on the elastic body within a mass of the fluid, as disclosed in laid-open Publication No. 58-170608 of unexamined Japanese Patent Application. Alternatively, the filling operation is effected after the mount body is assembled so as to define the pressure-receiving and equilibrium chambers. In this case, the fluid is injected into the mount body, through a hole which is open to the pressure-receiving chamber and is formed through the outer sleeve, so as to fill with the fluid the pressure-receiving chamber, and the equilibrium chamber through the orifice passage. Thereafter, the hole formed through the outer sleeve is closed by or sealed with a closure member, such as a rivet.

In the former method described above, the fluid filling the elastic mount inevitably adheres to an outer surface of the mount while the outer sleeve is fitted on the elastic body within the mass of the fluid. Therefore, it is necessary to wash and dry the elastic mount after the filling operation, so as to remove the fluid from the surface of the mount. Thus, the known elastic mount is manufactured with relatively low efficiency.

The above problem is not encountered in the latter method in which the fluid is injected into the mount through the hole formed through the outer sleeve. However, it is necessary to form a recessed portion in the outer sleeve at which the injection hole is open, so as to prevent the rivet for closing the hole from protruding on the outer circumferential surface of the outer sleeve at which the mount is press-fitted in one of the two vehicle members to be flexibly connected. The formation of the recessed portion results in reduction in the mass of the elastic body and the volume of the pressure-receiving chamber, which leads to deterioration in the vibration damping capability and durability of the elastic mount. Further, when a considerably high pressure is developed in the pressure-receiving chamber upon application of a vibrational load, for example, the rivet or other similar closure member used for sealing up the injection hole is not capable of enduring such a high fluid pressure in the chamber, making it difficult to assure high fluid-tightness of the mount. Thus, the elastic mount produced according to the latter method is not satisfactory in terms of the durability and the operating reliability.

SUMMARY OF THE INVENTION

It is therefore an object of the present invention to provide an improved method suitable for manufacturing a fluid-filled elastic mount, according to which the filling of the mount with a non-compressible fluid can be efficiently accomplished, assuring sufficiently high fluid-tightness of the mount, without affecting vibration damping capability of the mount obtained according to the method.

The above object may be achieved according to the principle of the present invention, which provides a method of manufacturing a fluid-filled elastic mount. The mount which includes an elastic body flexibly connecting an inner and an outer sleeve which are radially spaced apart from each other, means for defining a pressure-receiving chamber and a variable-volume-equilibrium chamber which are formed between the inner and outer sleeves and which are filled with a non-compressible fluid, and means for defining an orifice passage for fluid connection between the pressure-receiving and equilibrium chambers. The pressure-receiving chamber undergoes pressure changes due to elastic deformation of the elastic body upon application of a vibrational load. The equilibrium chamber is defined partially by a rigid member and partially by a flexible diaphragm which permits volumetric changes of the equilibrium chamber. The method comprises the steps of: (a) preparing a mount body having the pressure-receiving chamber, the equilibrium chamber and the orifice passage; (b) forming at least one injection hole through the rigid member defining the equilibrium chamber, so that the above-indicated at least one injection hole is open on an outer surface of the elastic mount other than an outer circumferential surface of the outer sleeve; (c) injecting the non-compressible fluid through the above-indicated at least one injection hole, into the equilibrium chamber, the orifice passage and the pressure-receiving chamber; and (d) fluid-tightly closing the above-indicated at least one injection hole upon completion of filling of the equilibrium chamber, the orifice member and the pressure-receiving chamber with the non-compressible fluid According to the method of the present invention described above, the fluid filling the elastic mount is prevented from adhering to the outer surface of the mount, when the pressure-receiving and equilibrium chambers and the orifice passage are filled with the fluid. At the same time, the filling of the mount with the fluid can be efficiently effected without affecting the vibration damping capability of the mount, while assuring high fluid-tightness of the mount. Thus, the elastic mount produced according to the present method has excellent durability and high operating reliability.

The above-indicated at least one injection hole may consist of one hole which is formed in an axial direction of the elastic mount such that the hole is open on an axial end surface of the elastic mount.

The mount body may be partly prepared by preparing an inner unit including the inner sleeve and an intermediate sleeve disposed radially outwardly of the inner sleeve, such that the inner and intermediate sleeves are flexibly connected to each other by the elastic body formed therebetween, and such that at least one pocket is formed in the elastic body such that the pocket or pockets is/are open on an outer circumferential surface of the inner unit through the intermediate sleeve.

In the above form of the invention, the rigid member may consist of the intermediate sleeve including a recessed part partially defining the equilibrium chamber, which recessed part is inwardly recessed in a radial direction of the elastic mount and cooperates with the flexible diaphragm to define the equilibrium chamber. In this case, one injection hole is formed in an axial direction of the elastic mount, through one of opposite side walls of the recessed part which are opposed to each other in the axial direction.

The mount body may be prepared such that the rigid member is fixed to the inner sleeve so as to extend from the inner sleeve in a radial direction of the elastic mount for partially defining the equilibrium chamber. In this case, the rigid member has a radial hole formed in a portion of the rigid member which extends from the inner sleeve such that the radial hole is open in the equilibrium chamber.

In the above form of the invention, one injection hole may be formed in an axial direction of the elastic mount, through the above-indicated portion of the rigid member, such that the hole communicates with the radial hole.

Each injection hole may be fluid-tightly closed with a rivet which is inserted therethrough.

The non-compressible fluid may be injected such that the equilibrium and pressure-receiving chambers and the orifice passage are evacuated prior to or during injection of the fluid to fill the chambers and orifice passage.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
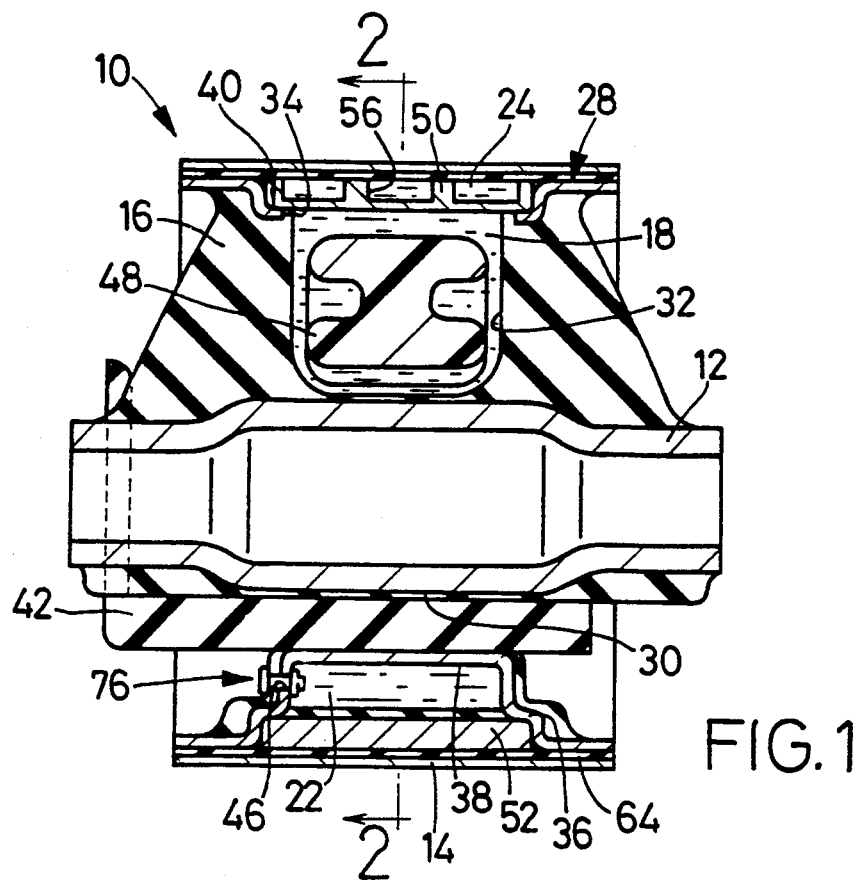
FIG. 1 is an elevational view in axial cross section of a vehicle engine mount which is manufactured according to one embodiment of the method of the present invention.
Figure 2:
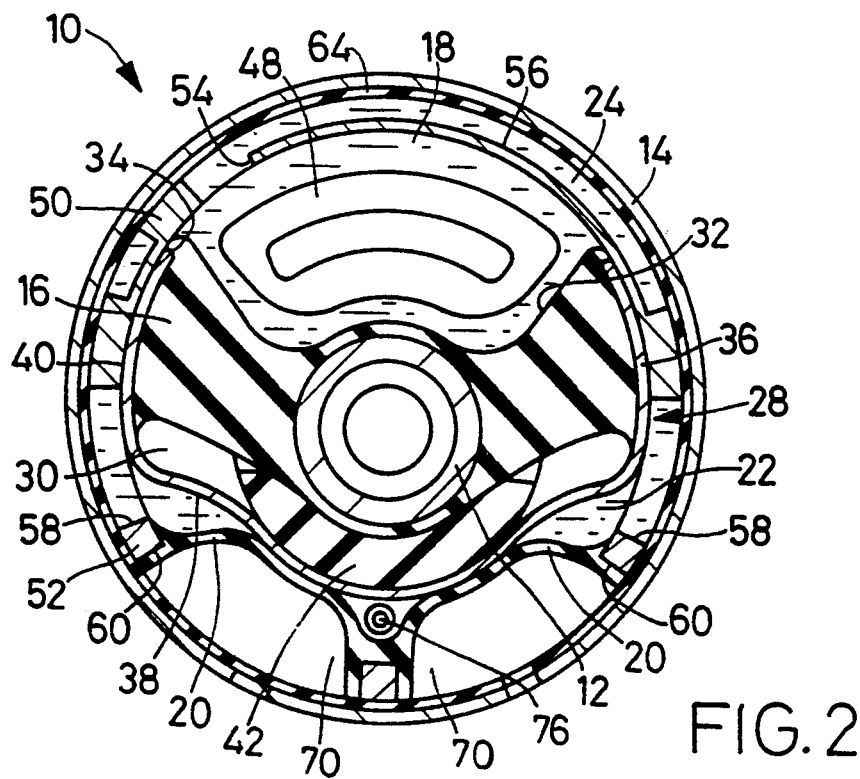
FIG. 2 is a cross sectional view taken along line 2—2 of FIG. 1.
Figure 3:
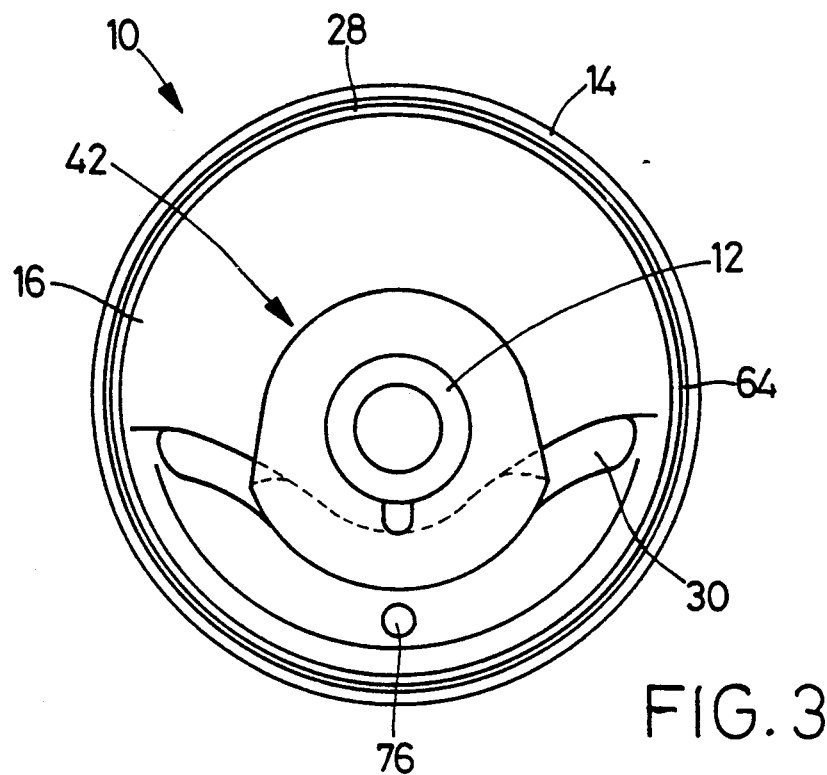
FIG. 3 is a side view of the engine mount of FIG. 1, as seen from the left-hand side of FIG. 1.

Referring first to FIGS. 1 through 3, there is shown a cylindrical fluid-filled elastic engine mount for a motor vehicle, which is suitably manufactured by a method according to one embodiment of this invention. The engine mount 10 shown in these figures includes an inner and an outer sleeve 12, 14 which are radially spaced apart from each other, and a generally cylindrical elastic body 16 interposed between the inner and outer sleeves 12, 14 for flexibly connecting the two sleeves 12, 14. Between the inner and outer sleeves 12, 14 of the engine mount 10, there are formed a pressure-receiving chamber 18 and a variable-volume equilibrium chamber 22, which are located in diametrically opposite portions of the sleeves 12, 14 and which are filled with a non-compressible fluid. The pressure in the pressure-receiving chamber 18 is changed due to a volumetric change thereof caused by elastic deformation of the elastic body 16 when a vibrational load is applied between the inner and outer sleeves 12, 14 during use of the engine mount 10. The equilibrium chamber 22 is partially defined by a flexible diaphragm 20, so that a change in the pressure in the equilibrium chamber 22 is absorbed or prevented by elastic deformation of the flexible diaphragm 22. These pressure-receiving and equilibrium chambers 18, 22 are held in fluid communication with each other through an orifice passage 24 formed in the engine mount 10.

The engine mount 10 constructed as described above is installed on a motor vehicle so as to flexibly support an engine unit such that the inner sleeve 12 is fixed to the vehicle body while the outer sleeve 14 is fixed to the engine unit. When a vibrational load or dynamic load is applied between the inner and outer sleeves 12, 14 of the engine mount 10 installed on the vehicle as described above, the fluid is forced to flow between the pressure-receiving and equilibrium chambers 18, 22 through the orifice passage 24, based on a pressure difference between the two chambers 18, 22. Thus, the elastic mount 10 is capable of damping vibrations applied thereto, based on the flows of the fluid or resonance of the fluid flowing through the orifice passage 24.

There will next be described in detail an exemplary method of manufacturing the engine mount 10 constructed as described above.

Figure 4:
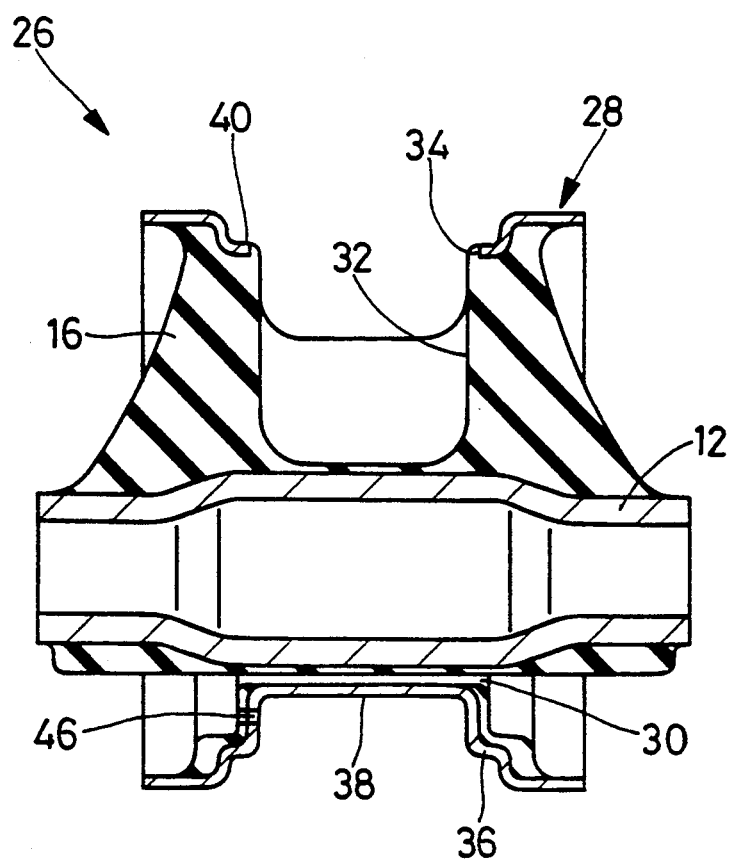
FIG. 4 is an axial cross sectional view of an inner unit of the engine mount of FIG. 1, which is prepared by vulcanizing an elastic body between an inner and an intermediate sleeve.

Initially, there is prepared an inner unit 26 as shown in FIG. 4, which includes the inner sleeve 12, an intermediate metallic sleeve 28, and the elastic body 16 interposed between the two sleeves 12, 28. The intermediate sleeve 28 is disposed radially outwardly of the inner sleeve 12, such that the inner and intermediate sleeves 12, 28 are eccentric with each other by a suitable radial distance in a load-receiving direction (vertical direction as viewed in FIG. 2) in which the engine mount primarily receives a vibrational load when installed in place on the vehicle. The elastic body 16 is formed by vulcanization such that the elastic body 16 is bonded to the inner and intermediate sleeve 12, 28, to provide the inner unit 26.

Between the intermediate sleeve 28 and the elastic body 16, there is defined an axial void 30 formed in the axial direction of the mount. As indicated in FIG. 2, this axial void 30 is located on one of diametrically opposite sides of the inner sleeve 10 as viewed in the load-receiving direction, on which the radial distance between the radial center of the inner sleeve 12 and the intermediate sleeve 28 is the smallest. The axial void 30 has a generally arcuate shape as seen in the plane of FIG. 2, which corresponds to about a half of the circumference of the sleeves 12, 28. In the presence of the axial void 30, the elastic body 16 is present only on the side on which the above-indicated radial distance is relatively large, that is, only in the generally upper part of the space within the intermediate sleeve 28 as viewed in FIG. 2.

Referring to FIG. 4, the elastic body 16 has a pocket 32 in the form of a recess open on the outer circumferential surface, and the intermediate sleeve 28 has a window 34 aligned with the opening of the pocket 32, so that the pocket 32 is open on the outer surface of the intermediate sleeve 28.

As shown in FIG. 4, the intermediate sleeve 28 has an axially intermediate portion 36 which has a smaller diameter than the other portion. This axially intermediate portion 36 has a recessed part 38 over a circumferential length corresponding to that of the arc of the axial void 30, as indicated in FIG. 2. Namely, the recessed part 38 is radially inwardly recessed as compared with the other portion of the axially intermediate portion 36, so that the bottom wall of the recessed part 38 cooperates with the elastic body 16 to define the axial void 30. Between the opposite ends of the recessed part 38, there is formed a part-circumferential groove 40 whose bottom is defined by the above-indicated other portion of the axially intermediate portion 36. Thus, the recessed part 38 and the part-circumferential groove 40 cover the entire circumference of the intermediate sleeve 28.

The intermediate sleeve 28 has an axial injection hole 46 formed in the axial direction of the mount, through one of the axially opposite side walls of the recessed part 38 of the sleeve 28.

Figure 5:
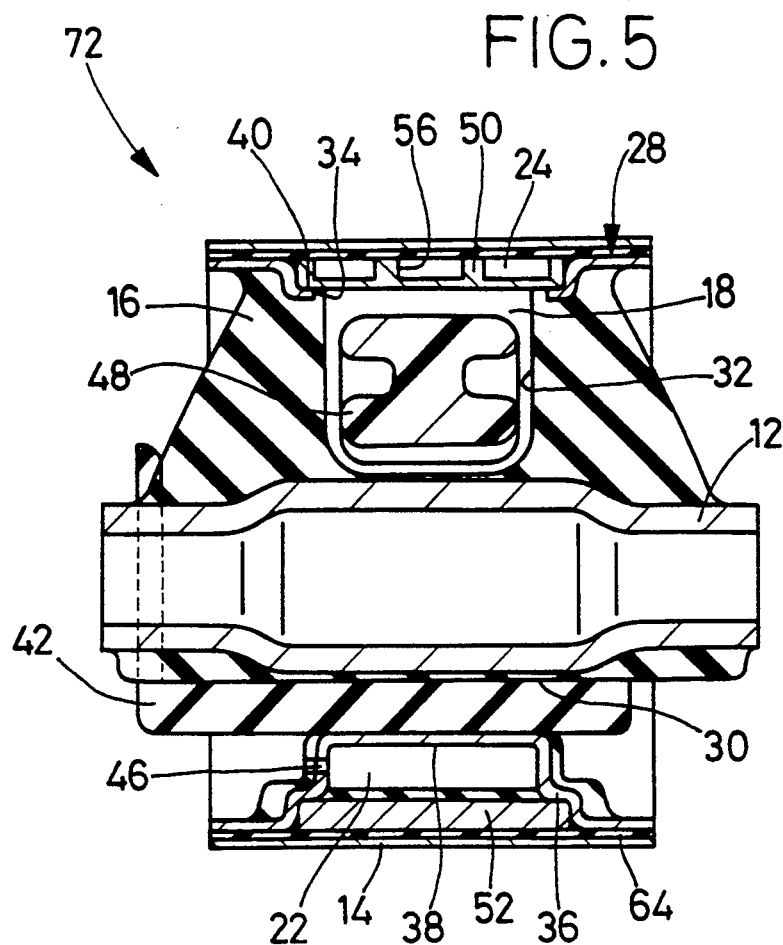
FIG. 5 is an axial cross sectional view of a mount body which is obtained in the process of manufacturing the engine mount of FIG. 1.

Within the axial void 30 of the inner unit 26, there is accommodated a rebound stop 42 which is formed of a suitable elastic rubber material, as indicated in FIG. 5. This rebound stop 42 has a generally arcuate shape as indicated in FIG. 2, and is fixed to the inner sleeve 12.

The intermediate sleeve 28 of the inner unit 26 is subjected to a drawing operation as needed to give the elastic body 16 a desired amount of radially inward pre-compression. Subsequently, a movable block 48 is placed in the pocket 32 provided in the inner unit 26. This movable block 48 is made of a relatively rigid material, and has an outer profile similar to the configuration of the pocket 32 (pressure-receiving chamber 18). However, the block 48 has smaller dimensions than the dimensions of the pocket 32 (pressure-receiving chamber 18), so that the block 48 is freely movable within the chamber 18. Then, a first and a second orifice-defining member 50, 52 which are substantially semi-cylindrical members are fitted in the part-circumferential groove 40 defined by the intermediate sleeve 28, such that the first orifice-defining member 50 covers one half of the circumference of the intermediate sleeve 12 on the side of the window 34, while the second orifice-defining member 52 covers the other half on the side of the recessed part 38. Thereafter, the outer sleeve 14 indicated above is fitted on the outer circumferential surface of the intermediate sleeve 28. Thus, a mount body 72 as indicated in FIG. 5 is prepared.

Figure 6:
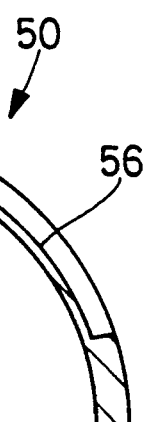
FIG. 6 is a cross sectional view of a first orifice-defining member used in the engine mount of FIG. 1.
Figure 7:
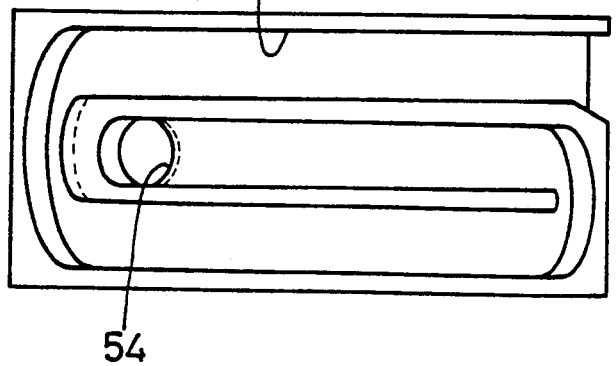
FIG. 7 is a plan view of the first orifice-defining member of FIG. 6.
Figure 8:
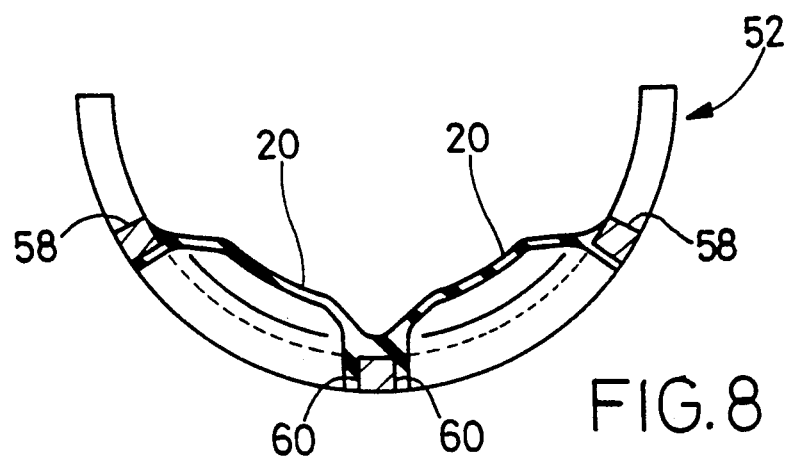
FIG. 8 is a cross sectional view of a second orifice-defining member used in the engine mount of FIG. 1.
Figure 9:
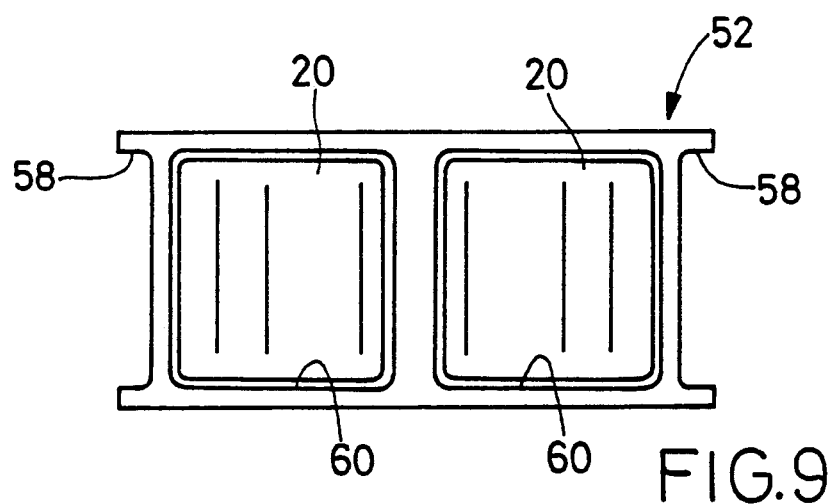
FIG. 9 is a bottom plan view of the second orifice-defining member of FIG. 8.

More specifically described referring to FIGS. 6 and 7, the first orifice-defining member 50 has a spiral groove 56 formed on the outer surface such that the inner end of the groove 56 is located substantially at the center of the surface while the outer end is open at one of the opposite ends of the member 50 as viewed in the circumferential direction of the intermediate sleeve 28. The inner end of the spiral groove 56 communicates with a communication hole 54 formed through the wall thickness of the orifice-defining member 50. On the other hand, the second orifice-defining member 52 has two cutouts 58, 58 at the circumferentially opposite ends, and two spaced-apart rectangular windows 60, 60 between the cutouts 58, as shown in FIGS. 8 and 9. This orifice-defining member 52 is provided with the above-indicated elastically deformable or flexible diaphragm 20 secured to its inside so as to fluid-tightly close the windows 60, as indicated in FIG. 8.

The inner circumferential surface of the outer sleeve 14 is entirely covered by a sealing rubber layer 64 bonded thereto by vulcanization. After the outer sleeve 14 is fitted on the intermediate sleeve 28, the outer sleeve 14 is subjected to a radially inward drawing operation using eight dies, so that the sealing rubber layer 64 is fixedly fitted on the outer circumferential surface of the intermediate sleeve 28.

The pocket 32 provided in the inner unit 26 is fluid-tightly closed by the first orifice-defining member 50 and the outer sleeve 14, so as to provide the pressure-receiving chamber 18 indicated above. The pressure in the pressure-receiving chamber 18 is changed due to a volumetric change thereof caused by elastic deformation of the elastic body 16 when a vibrational load is applied between the inner and outer sleeves 12, 14 during use of the engine mount 10. Further, the recessed part 38 of the intermediate sleeve 28 is fluid-tightly closed by the second orifice-defining member 52 and the outer sleeve 14, whereby the variable-volume equilibrium chamber 22 indicated above is formed. Namely, the equilibrium chamber 22 is defined between the diaphragm 20 provided on the second orifice-defining member 52, and the recessed part 38 of the intermediate sleeve 28. A change in the pressure in the equilibrium chamber 22 is absorbed or prevented by elastic deformation of the flexible diaphragm 20.

In the instant embodiment, the radially inner wall and side walls of the equilibrium chamber 22 are formed by the recessed part 38 of the intermediate sleeve 28, which serves as a rigid member, while the radially outer wall of the chamber 22 is formed by the flexible diaphragm 20. Further, spaces 70, 70 are left between the inner surface of the outer sleeve 14 and the diaphragm 20, so that the spaces 70 permit the diaphragm 20 to undergo elastic deformation.

With the outer sleeve 14 being fitted on the intermediate sleeve 28, the spiral groove 56 and the cutouts 58 of the first and second orifice-defining members 50, 52 are fluid-tightly closed by the inner circumferential surface of the outer sleeve 14, more specifically, by the sealing rubber layer 52 formed on the outer sleeve 14, so as to provide the above-indicated orifice passage 24 which communicates with the pressure-receiving chamber 18 and the equilibrium chamber 22 for fluid communication therebetween.

Subsequently, a suitable non-compressible fluid is injected into the mount body 72 (FIG. 5) constructed as described above, through the injection hole 46 formed through a portion of the recessed part 38 of the intermediate sleeve 28 which provides one of the axially opposite walls of the equilibrium chamber 22. In this manner, a space within the mount body 72 which consists of the equilibrium chamber 22, the orifice passage 24, and the pressure-receiving chamber 18 is filled with the injected fluid.

The injection of the fluid into the mount body 72 is effected in the manner as described below. Initially, the space consisting of the equilibrium chamber 22, the orifice passage 24 and the pressure-receiving chamber 18 is evacuated with a vacuum pump, for example, through the injection hole 46. Then, a suitable non-compressible fluid is injected into the space through the injection hole 46, so that the fluid fills the equilibrium chamber 22, the orifice passage 24 and the pressure-receiving chamber 18 successively in the order of description. The non-compressible fluid used in this embodiment may be a low-viscosity fluid, such as water, alkylene glycol, polyalkylene glycol or silicone oil, which assures intended vibration damping characteristics of the engine mount.

After the space in the mount body 72 is filled with the fluid as described above, the injection hole 46 formed through the intermediate sleeve 28 is fluid-tightly closed by a rivet 76, as shown in FIG. 1 through 3, whereby the fluid-tightness of the chambers 18, 22 and the orifice passage 24 is suitably ensured. Thus, the engine mount 10 as shown in FIGS. 1-3 is completed.

According to the above-described method of manufacturing the engine mount 10, the fluid filling the mount 10 is prevented from soiling the outer surface of the mount 10 when the fluid is injected into the chambers 18, 22 and orifice passage 24 in the mount body 72. Therefore, it is not necessary to wash and dry the mount 10 after the filling step, so as to remove the fluid from the outer surface of the mount 10. Thus, the engine mount 10 can be manufactured according to the present method with an improved efficiency, and is thus available at a reduced cost.

Further, since the injection hole 46 is open on one of the axially opposite end surfaces of the engine mount 10, in other words, since the hole 46 is not open on the outer circumferential surface of the outer sleeve 14 at which the mount 10 is press-fitted into a member fixed to the engine unit, the head portion of the rivet 76 closing the hole 46 does not disturb the mounting of the vehicle member to be fitted on the outer sleeve 14.

Moreover, in the engine mount 10 manufactured according to the present method, the injection hole 46 is formed through the rigid member in the form of the intermediate sleeve 28. Therefore, the rivet 76 can be sufficiently firmly attached to the intermediate sleeve 28 so as to fluid-tightly close the hole 46. Additionally, the injection hole 46 is provided in the mount 10 such that the hole 46 is open to the equilibrium chamber 22 in which the pressure change is absorbed by the flexible diaphragm 20. Therefore, even if a relatively high pressure occurs in the pressure-receiving chamber 18 upon application of a vibrational load, such a high pressure never acts directly on the rivet 76 closing the hole 46, thereby securing high fluid-tightness of the chambers 18, 22 and the orifice passage 24. Thus, the engine mount 10 produced according to the present method exhibits improved durability and relatively high reliability.

Figure 10:
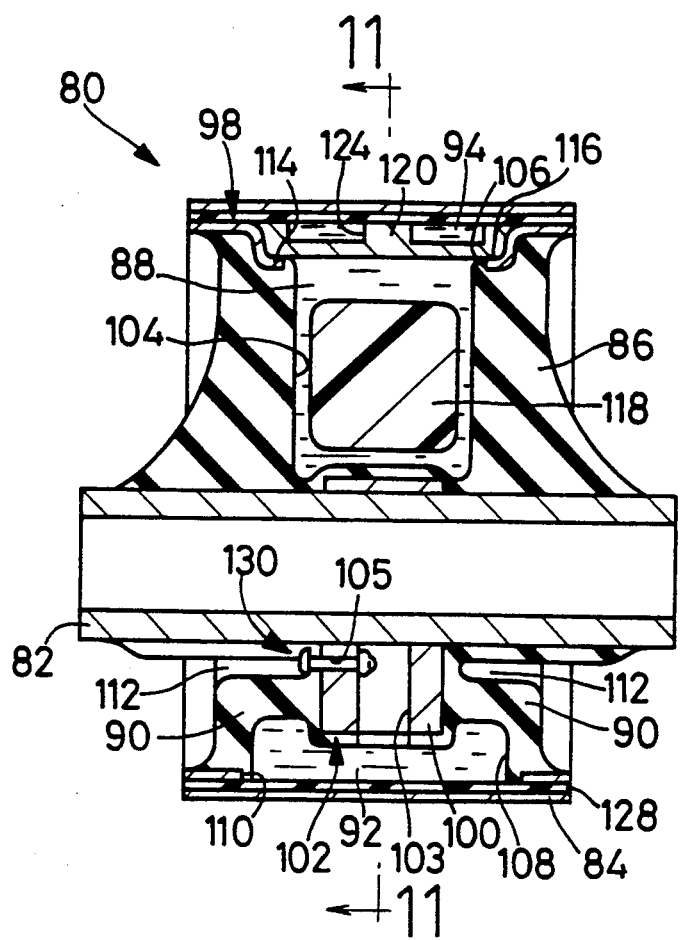
FIG. 10 is an elevational view in axial cross section of a vehicle engine mount which is manufactured according to another embodiment of the present invention.
Figure 11:
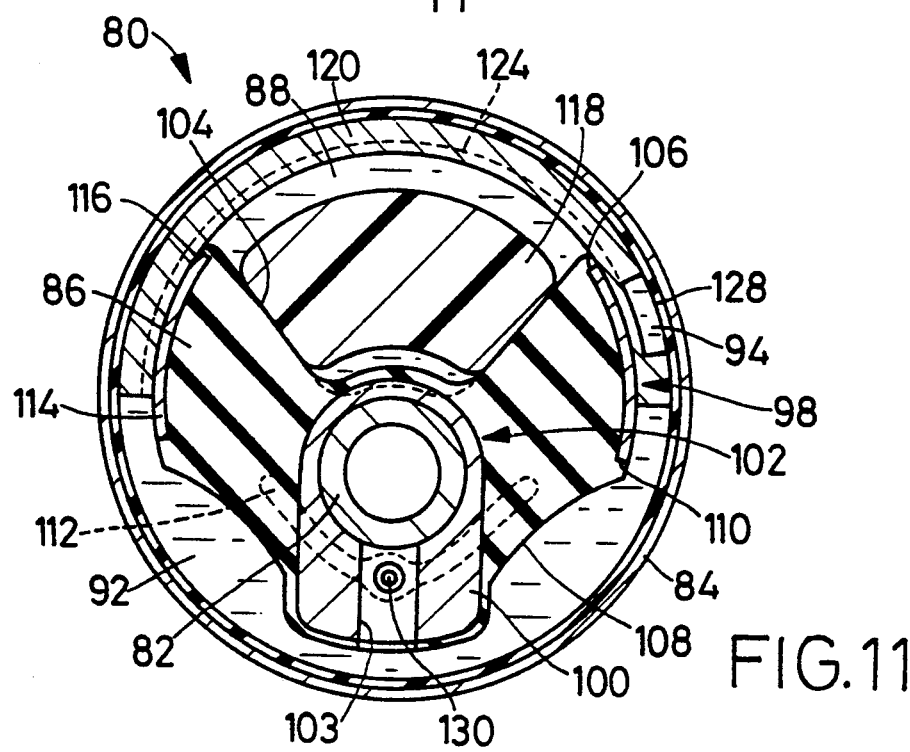
FIG. 11 is a cross sectional view taken along line 11—11 of FIG. 10.
Figure 12:
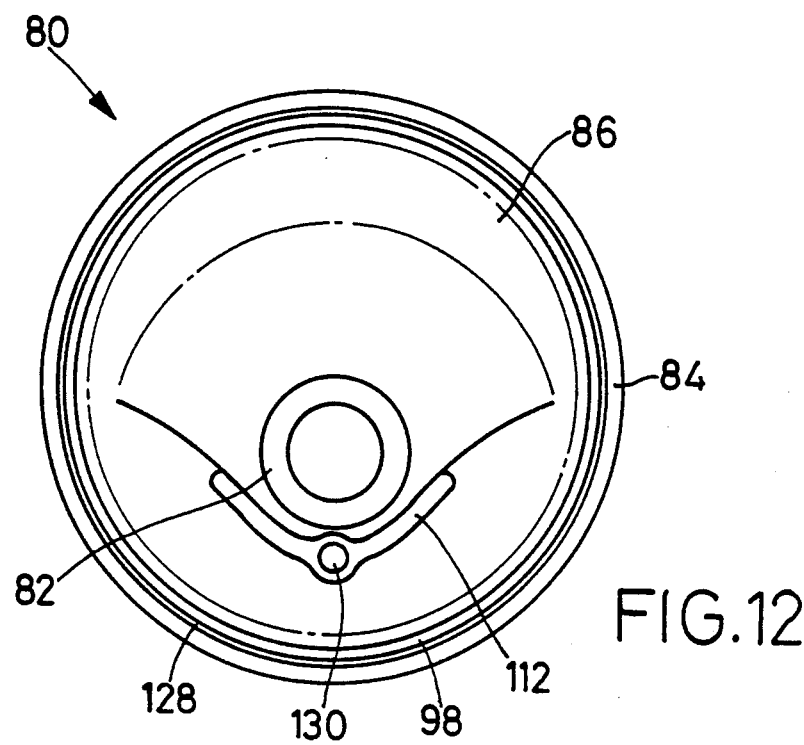
FIG. 12 is a side view of the engine mount of FIG. 10, as seen from the left-hand side of FIG. 10.

Referring next to FIGS. 10 through 12, there is shown a cylindrical fluid-filled elastic engine mount 80 for a motor vehicle, which is manufactured by a method according to another embodiment of this invention. The engine mount 80 shown in these figures includes an inner and an outer sleeve 82, 84 which are radially spaced apart from each other, and a generally cylindrical elastic body 86 interposed between the inner and outer sleeves 82, 84 for flexibly connecting the two sleeves 82, 84. Between the inner and outer sleeves 82, 84 of the engine mount 80, there are formed a pressure-receiving chamber 88 and a variable-volume equilibrium chamber 92, which are located in diametrically opposite portions of the sleeves 82, 84 and which are filled with a non-compressible fluid. The pressure in the pressure-receiving chamber 88 is changed due to a volumetric change thereof caused by elastic deformation of the elastic body 86 when a vibrational load is applied between the inner and outer sleeves 82, 84 during use of the engine mount 80. The equilibrium chamber 92 is partially defined by a pair of thin-walled portions 90 of the elastic body 86 which serve as a flexible diaphragm, so that a change in the pressure in the equilibrium chamber 92 is absorbed or prevented by elastic deformation of the thin-walled portion 90. These pressure-receiving and equilibrium chambers 88, 92 are held in fluid communication with each other through an orifice passage 94 formed in the engine mount 80.

The engine mount 80 constructed as described above is installed so as to flexibly support an engine unit on a vehicle such that the inner sleeve 82 is fixed to the vehicle body while the outer sleeve 84 is fixed to the engine unit, like the engine mount 10 of the first embodiment. When a vibrational load or dynamic load is applied between the inner and outer sleeves 82, 84 of the engine mount 80 installed on the vehicle as described above, the fluid is forced to flow between the pressure-receiving and equilibrium chambers 88, 92 through the orifice passage 94, based on a pressure difference between the two chambers 88, 92. Thus, the elastic mount 80 is capable of damping vibrations applied thereto, based on the flows of the fluid or resonance of the fluid flowing through the orifice passage 94.

There will next be described in detail an exemplary method of manufacturing the engine mount 80 constructed as described above.

Figure 13:
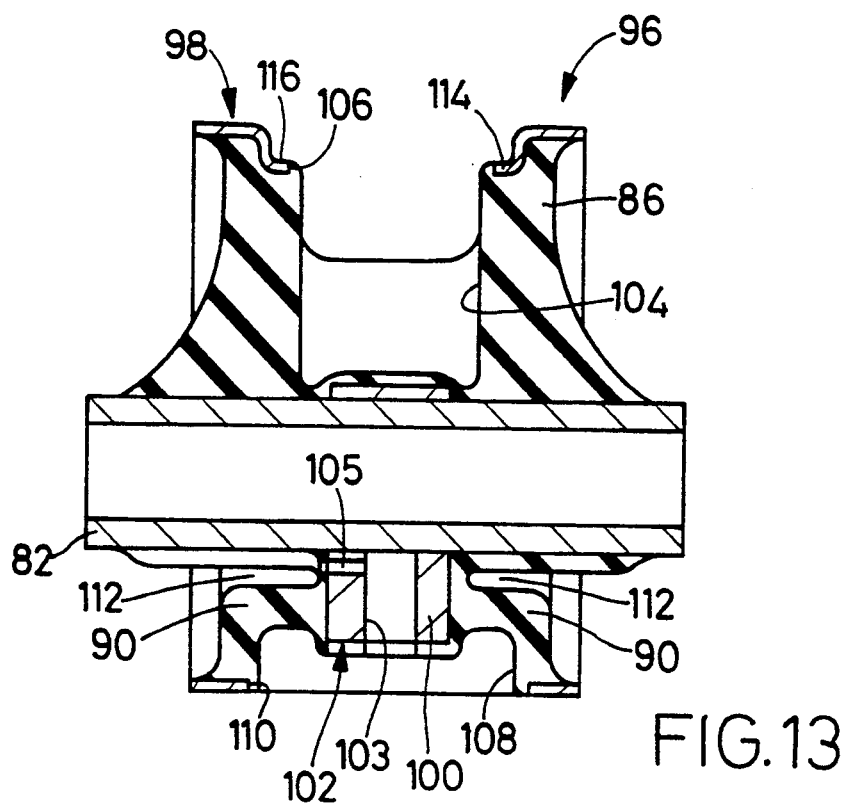
FIG. 13 is an axial cross sectional view of an inner unit of the engine mount of FIG. 10, which is prepared by vulcanizing an elastic body between an inner and an intermediate sleeve.

Initially, there is prepared an inner unit 96 as shown in FIG. 13, which includes the inner sleeve 82, an intermediate metallic sleeve 98, and the elastic body 86 interposed between the two sleeves 82, 98. The intermediate sleeve 98 is disposed radially outwardly of the inner sleeve 82, such that the inner and intermediate sleeves 82, 98 are eccentric with each other by a suitable radial distance in a load-receiving direction (vertical direction as viewed in FIG. 11) in which the engine mount primarily receives a vibrational load when installed in place on the vehicle. The elastic body 86 is formed by vulcanization such that the elastic body 86 is bonded at its inner and outer circumferential surfaces to the inner and intermediate sleeves 82, 98, respectively, to provide the inner unit 96.

The inner sleeve 82 of the inner unit 96 is a cylindrical member having a relatively large wall thickness. On the axially intermediate portion of this inner sleeve 82, there is fixedly fitted a generally annular stopper member 102 made of a metallic material, which includes a connecting portion 100 extending radially outwards from the sleeve 82. This connecting portion 100 has a radial hole 103 formed therethrough in the radial direction of the mount 80, such that the radially inner end of the hole 103 is closed by the inner sleeve 82 which extends through the annular stopper member 102. Further, the connecting portion 100 of the stopper member 102 has an injection hole 105 formed in the axial direction of the mount 80, such that the hole 105 extends from one of the axially opposite side faces of the connecting portion 100 which communicates with the radial hole 103, as shown in FIG. 13.

The elastic body 86 of the inner unit 96 has a first pocket 104 formed on one of diametrically opposite sides of the inner sleeve 82 as viewed in the load-receiving direction, on which the radial distance between the radial center of the inner sleeve 82 and the intermediate sleeve 98 is the largest. The intermediate sleeve 98 has a first window 106 aligned with the opening of the first pocket 104, so that the pocket 104 is open on the outer surface of the intermediate sleeve 98 through the window 106. Further, the elastic body 104 has a second pocket 108 formed on the other side of the inner sleeve 80 on which the above-indicated radial distance is relatively small. The intermediate sleeve 98 also has a second window 110 aligned with the opening of the second pocket 108, so that the pocket 108 is open on the outer surface of the intermediate sleeve 98 through the window 110. The above-indicated stopper member 102 is embedded in and secured by vulcanization to the elastic body 86, such that the connecting portion 100 extends through a portion of the elastic body 86 which defines the second pocket 108, so as to provide an axially intermediate portion of the bottom wall of the pocket 108, so that the radial hole 103 of the connecting portion 100 is open on the bottom wall of the pocket 108. That is, the second pocket 108 is partially defined by the thin-walled portions 90 of the elastic body 86 and partially defined by the connecting portion 100.

The elastic body 86 has a pair of generally arcuate recesses 112, 112 having a suitable axial length, which are formed from the axially opposite ends of the elastic body 86 and which are located between the inner sleeve 82 and the thin-walled portions 90 of the elastic body 86. These recesses 112, 112 extend in the axial direction of the mount 80, such that the recesses 112 are open on the axially opposite end surfaces of the elastic body 86. In the presence of the recesses 112, the axially outer portions of the bottom wall of the second pocket 108 are constituted by the above-indicated pair of elastically deformable or flexible thin-walled portions 90 of the elastic body 83, as shown in FIG. 13.

The intermediate sleeve 98 has an axially intermediate portion 114 which has a smaller diameter than the other portion. The axially intermediate portion 114 defines two part-circumferential grooves 116, 116 which extend between the corresponding circumferential ends of the first and second windows 106, 110 of the sleeve 98, so as to connect the first and second pockets 104, 108 to each other, as shown in FIG. 11.

Figure 14:
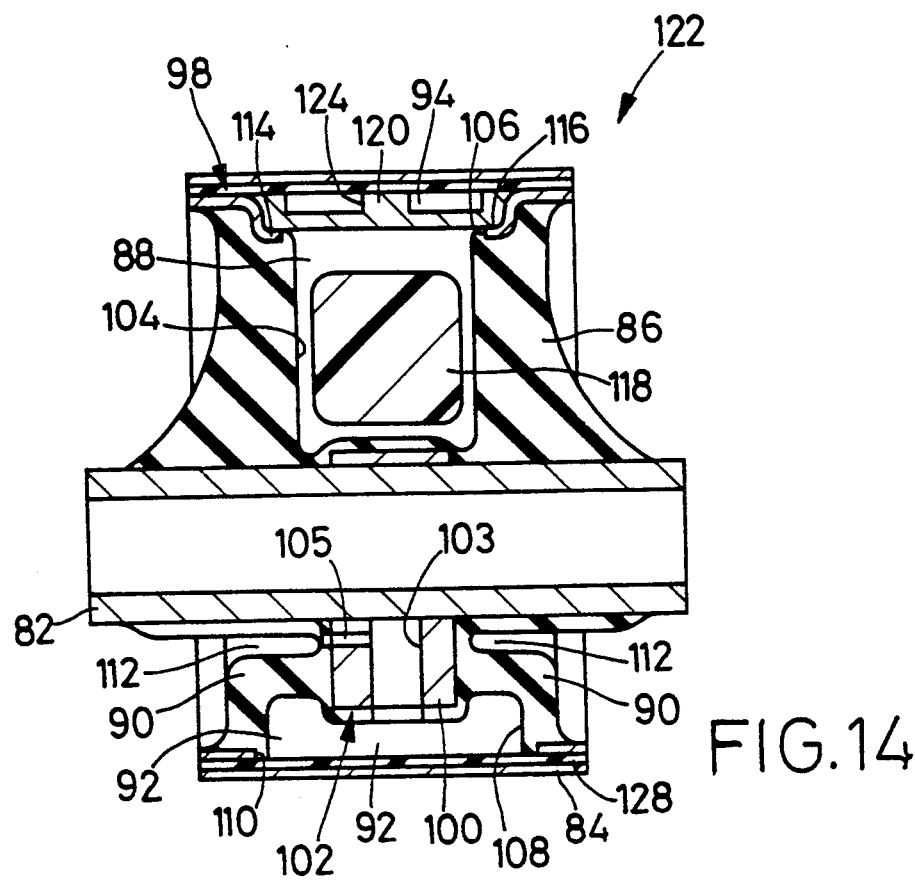
FIG. 14 is an axial cross sectional view of a mount body which is obtained in the process of manufacturing the engine mount of FIG. 10.

The intermediate sleeve 98 of the thus constructed inner unit 96 is subjected to a drawing operation as needed to give the elastic body 86 a desired amount of radially inward pre-compression. Subsequently, a movable block 118 is placed in the first pocket 104 provided in the inner unit 96. This movable block 118 is made of a relatively rigid material, and has an outer profile similar to the configuration of the first pocket 104 (pressure-receiving chamber 88). However, the block 118 has smaller dimensions than the dimensions of the pocket 104 (pressure-receiving chamber 88), so that the block 118 is freely movable within the chamber 88. Then, an orifice-defining member 120 which has a substantially semi-cylindrical shape is fitted in the part-circumferential grooves 116, so as to cover one half of the circumference of the intermediate sleeve 98 on the side of the first window 106. Thereafter, the outer sleeve 84 indicated above is fitted on the outer circumferential surface of the intermediate sleeve 98. Thus, a mount body 122 as indicated in FIG. 14 is prepared.

Figure 15:
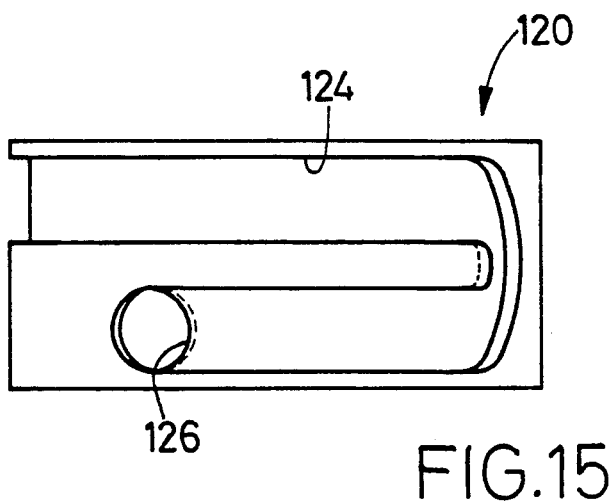
FIG. 15 is a plan view of an orifice-defining member used in the engine mount of FIG. 10.

More specifically described referring to FIG. 15, the orifice-defining member 120 has a generally U-curved groove 124 formed on the outer surface so as to extend generally in the circumferential direction of the mount 80, such that the groove 124 is turned back at one of the opposite ends of the member 120 as viewed in the circumferential direction. The inner end of the U-curved groove 124 communicates with a communication hole 126 formed through the wall thickness of the orifice-defining member 120, while the outer end is open at the other circumferential end of the member 120. With this orifice-defining member 120 mounted on the inner unit 96, the inner end of the groove 124 communicates with the first pocket 104, while the outer end communicates with the second pocket 108.

The inner circumferential surface of the outer sleeve 84 is entirely covered by a thin-walled sealing rubber layer 128 bonded thereto by vulcanization. After the outer sleeve 84 is fitted on the intermediate sleeve 98, the outer sleeve 84 is subjected to a radially inward drawing operation using eight dies, so that the sealing rubber layer 128 is fixedly fitted on the outer circumferential surface of the intermediate sleeve 98.

The first and second pockets 104, 108 provided in the inner unit 96 are fluid-tightly closed by the orifice-defining member 120 and the outer sleeve 84, whereby the pressure-receiving chamber 88 and the variable-volume equilibrium chamber 92 are formed within the first and second pockets 104, 108, respectively. The pressure in the pressure-receiving chamber 18 is changed due to a volumetric change thereof caused by elastic deformation of the elastic body 86 when a vibrational load is applied between the inner and outer sleeves 82, 84 during use of the engine mount 80. On the other hand, a change in the pressure in the equilibrium chamber 92 is absorbed or prevented by elastic deformation of the flexible diaphragm 90.

In the engine mount 80, the equilibrium chamber 92 includes the radial hole 103 of the connecting portion 100 of the stopper member 102, which is open at the bottom of the second pocket 108 indicated above. It is also to be noted that the equilibrium chamber 92 is defined partly by a rigid member, that is, the connecting portion 100 of the stopper member 102 which has the radial hole 103, and partly by a flexible diaphragm in the form of the two thin-walled portions 90 of the elastic body 86.

With the outer sleeve 84 being fitted on the intermediate sleeve 98, the U-curved groove 124 of the orifice-defining members 120 is fluid-tightly closed by the inner circumferential surface of the outer sleeve 84, more specifically, by the sealing rubber layer 128 formed on the outer sleeve 84, so as to provide the above-indicated orifice passage 94 which communicates with the pressure-receiving chamber 88 and the equilibrium chamber 92 for fluid communication therebetween.

Subsequently, a suitable non-compressible fluid is injected into the mount body 122 (FIG. 14) constructed as described above, through the injection hole 105 formed at a portion of the stopper member 102 which partially defines the equilibrium chamber 92, so that a space which consists of the equilibrium chamber 92, the orifice passage 94, and the pressure-receiving chamber 88 is filled with the non-compressible fluid.

The injection of the fluid into the mount body 112 is effected in the manner similar to that adopted in the first embodiment. Initially, the space consisting of the equilibrium chamber 92, the orifice passage 94 and the pressure-receiving chamber 88 is evacuated with a vacuum pump, for example, through the injection hole 105. Then, the non-compressible fluid is injected into the space through the injection hole 105, so that the fluid fills the equilibrium chamber 92, the orifice passage 94 and the pressure-receiving chamber 88.

After the space in the mount body 122 is filled with the fluid as described above, the injection hole 105 formed in the stopper member 102 is fluid-tightly closed by a rivet 130, as shown in FIG. 10 through 12, whereby the fluid-tightness of the chambers 88, 92 and the orifice passage 94 is suitably ensured. Thus, the engine mount 80 as shown in FIGS. 10-12 is completed.

According to the above-described method of manufacturing the engine mount 80, the fluid filling the mount 80 is prevented from adhering to the outer surface of the mount 80 when the fluid is injected into the above space within the mount body 112. Further, the rivet 130 closing the hole 105 is firmly attached to the connecting portion 100 of the stopper member 102, assuring high fluid-tightness of the chambers 88, 92 and the orifice passage 94, and high durability of the engine mount 80. Moreover, the rivet 130 does not cause a problem upon installation of the mount 80 on the vehicle. Thus, the same effects as provided in the first embodiment can be provided in the present embodiment of the invention.

While the present invention has been described in detail in its presently preferred embodiments, it is to be understood that the invention is not limited to the details of the illustrated embodiments.

It is noted that the method of the present invention is applicable to a fluid-filled elastic mount whose construction is different from those of the illustrated engine mounts. For instance, the engine mount may employ various conventional arrangements for defining the pressure-receiving and equilibrium chambers and the orifice passage. That is, the construction of the elastic mount may be suitably changed depending upon required vibration damping/isolating characteristics and desirable size of the mount.

The rigid member which partially defines the equilibrium chamber (22, 92) and through which the injection hole (46, 105) is formed is not limited to the intermediate sleeve 28 and the stopper member 102 as used in the illustrated embodiments. For example, a part of the inner or outer sleeve radially protrudes as a rigid member to partially define the equilibrium chamber as described above.

It is also possible to provide two or more injection holes. In this case, the filling of the space within the mount body with the fluid is effected by evacuating the space through one or more of the injection holes, while injecting the fluid into the space through the other injection hole or holes.

While the rivet 76, 130 is used for closing the injection hole in the illustrated embodiments, some other closure member may be suitably used for this purpose.

It is also to be noted that the principle of the present invention is equally applicable to any fluid-filled elastic mounts other than the engine mount, for example, to a differential gear mount and a suspension bushing for motor vehicles, and even applicable to fluid-filled cylindrical elastic mounts used for various devices or equipment other than those used for motor vehicles. In particular, the method of the invention may be employed for producing the various types of fluid-filled elastic mount, irrespective of the viscosity of the fluid contained therein.

It is to be understood that the present invention may be embodied with various other changes, modifications and improvements, which may occur to those skilled in the art, without departing from the spirit and scope of the invention defined in the following claims.

What is claimed is:

1. A method of manufacturing a fluid-filled elastic mount which includes an elastic body flexibly connecting an inner and an outer sleeve which are radially spaced apart from each other, means for defining a pressure-receiving chamber and a variable-volume equilibrium chamber which are formed between the inner and outer sleeves and which are filled with a non-compressible fluid, and means for defining an orifice passage for fluid connection between the pressure-receiving and equilibrium chambers, said pressure-receiving chamber undergoing pressure changes due to elastic deformation of said elastic body upon application of a vibrational load, said equilibrium chamber being defined partially by a rigid member and partially by a flexible diaphragm which permits volumetric changes of the equilibrium chamber, comprising the steps of:

preparing a mount body having said pressure-receiving chamber, said equilibrium chamber and said orifice passage;

forming at least one injection hole through said rigid member partially defining said equilibrium chamber, such that said at least one injection hole is open on an outer surface of the elastic mount other than an outer circumferential surface of said outer sleeve;

injecting said non-compressible fluid through said at least one injection hole, into said equilibrium chamber, said orifice passage and said pressure-receiving chamber; and fluid-tightly closing said at least one injection hole upon completion of filling of the equilibrium chamber, the orifice passage and the pressure-receiving chamber with said non-compressible fluid 2. A method according to claim 1, wherein said step of forming at least one injection hole comprises forming one hole in an axial direction of the elastic mount, such that said one hole is open on an axial end surface of the elastic mount.

3. A method according to claim 1, wherein said step of preparing said mount body comprises preparing an inner unit including said inner sleeve and an intermediate sleeve disposed radially outwardly of the inner sleeve, such that said inner and intermediate sleeves are flexibly connected to each other by said elastic body formed therebetween, and such that at least one pocket is formed in said elastic body such that said at least one pocket is open on an outer circumferential surface of said inner unit through said intermediate sleeve.

4. A method according to claim 3, wherein said rigid member consists of said intermediate sleeve including a recessed part partially defining said equilibrium chamber, said recessed part being inwardly recessed in a radial direction of the elastic mount and cooperating with said flexible diaphragm to define said equilibrium chamber, said step of forming at least one injection hole comprising forming one hole in an axial direction of the elastic mount, through one of opposite side walls of said recessed part which are opposed to each other in said axial direction.

5. A method according to claim 1, wherein said step of preparing a mount body comprises fixing said rigid member to said inner sleeve so as to extend from said inner sleeve in a radial direction of the elastic mount for partially defining said equilibrium chamber, said rigid member having a radial hole formed in a portion of said rigid member which extends from said inner sleeve, said radial hole being open in said equilibrium chamber.

6. A method according to claim 5, wherein said step of forming at least one injection hole comprises forming one hole in an axial direction of the elastic mount, through said portion of said rigid member, such that said one hole communicates with said radial hole.

7. A method according to claim 5, wherein said step of preparing a mount body comprises forming two pockets in said elastic body such that said two pockets are closed by said outer sleeve to provide said pressure-receiving chamber and said equilibrium chamber, respectively, and further comprises providing said elastic body with a pair of thin-walled portions as said flexible diaphragm, which cooperate with said rigid member and said outer sleeve to define said equilibrium chamber.

8. A method according to claim 1, wherein said step of fluid-tightly closing said at least one injection hole comprises closing each of said at least one injection hole with a rivet which is inserted therethrough.

9. A method according to claim 1, wherein said step of injecting said non-compressible fluid comprises evacuating said equilibrium and pressure-receiving chambers and said orifice passage prior to or during injection of said fluid to fill said chambers and orifice passage.

10. A method according to claim 9, wherein said step of injecting said non-compressible fluid comprises evacuating said equilibrium and pressure-receiving chambers and said orifice passage, prior to injection of said fluid to fill said chambers and orifice passage.

11. A method according to claim 9, wherein said step of forming at least one injection hole comprises forming at least two holes, and wherein said step of injecting said non-compressible fluid comprises evacuating said equilibrium and pressure-receiving chambers and said orifice passage through at least one of said at least two holes, during injection of said fluid into said chambers and orifice passage through the rest of said at least two holes.

12. A fluid-filled elastic mount including an elastic body flexibly connecting an inner and an outer sleeve which are radially spaced apart from each other, means for defining a pressure-receiving chamber and a variable-volume equilibrium chamber which are formed between the inner and outer sleeves and which are filled with a non-compressible fluid, and means for defining an orifice passage for fluid connection between the pressure-receiving and equilibrium chambers, said pressure-receiving chamber undergoing pressure changes due to elastic deformation of said elastic body upon application of a vibrational load, said equilibrium chamber being defined partially by a rigid member and partially by a flexible diaphragm which permits volumetric changes of the equilibrium chamber, said fluid-filled elastic mount comprising:

at least one injection hole which is formed through said rigid member partially defining said equilibrium chamber, and through which said non-compressible fluid is injected into said equilibrium chamber, said orifice passage and said pressure-receiving chamber, said at least one injection hole being open on an outer surface of the elastic mount other than an outer circumferential surface of said outer sleeve; and at least one closure member for fluid-tightly closing said at least one injection hole upon completion of filling of the equilibrium chamber, the orifice passage and the pressure-receiving chamber with said non-compressible fluid.

13. A method of manufacturing a fluid-filled elastic mount which includes an elastic body flexibly connecting an inner and an outer sleeve which are radially spaced apart from each other, means for defining a pressure-receiving chamber and a variable-volume equilibrium chamber which are formed between the inner and outer sleeves, are spaced apart from each other in circumferential direction of the mount, and are filled with a non-compressible fluid, and means for defining an orifice passage for fluid connection between the pressure-receiving and equilibrium chambers, said pressure-receiving chamber undergoing pressure changes due to elastic deformation of said elastic body upon application of a vibrational load, said equilibrium chamber being defined partially by a flexible diaphragm which permits volumetric changes of the equilibrium chamber, comprising the steps of:

preparing a mount body having said pressure-receiving chamber, said equilibrium chamber and said orifice passage, and including a rigid member which cooperates with said flexible diaphragm to define said equilibrium chamber;

forming at least one injection hole through said rigid member partially defining said equilibrium chamber, such that said at least one injection hole is open on an outer surface of the elastic mount other than an outer surface of said outer sleeve;

injecting said non-compressible fluid through said at least one injection hole, into said equilibrium chamber, said orifice passage and said pressure-receiving chamber; and fluid-tightly closing said at least one injection hole upon completion of filling of the equilibrium chamber, the orifice passage and the pressure-receiving chamber with said non-compressible fluid.

14. A fluid-filled elastic mount including an elastic body flexibly connecting an inner and an outer sleeve which are radially spaced apart from each other, means for defining a pressure-receiving chamber and a variable-volume equilibrium chamber which are formed between the inner and outer sleeves, are spaced apart from each other in a circumferential direction of the mount, and are filled with a non-compressible fluid, and means for defining an orifice passage for fluid connection between the pressure-receiving and equilibrium chambers, said pressure-receiving chamber undergoing pressure changes due to elastic deformation of said elastic body upon application of a vibrational load, said equilibrium chamber being defined partially by a flexible diaphragm which permits volumetric changes of the equilibrium chamber, said fluid-filled elastic mount comprising:

at least one injection hole formed through said rigid member partially defining said equilibrium chamber, and through which said non-compressible fluid is injected into said equilibrium chamber, said orifice passage and said pressure-receiving chamber, said at least one injection hole being open on an outer surface sleeve; and at least one closure member for fluid-tightly closing said at least one injection hole upon completion of filling of the equilibrium chamber, the orifice passage and the pressure-receiving chamber with said non-compressible fluid.

* * * * *